United States Patent [19]
Seidel
[11] 3,760,303
[45] Sept. 18, 1973

[54] CONDUCTANCE-LOADED TRANSMISSION LINE RESONATOR

[75] Inventor: Harold Seidel, Warren, N.J.
[73] Assignee: Bell Telephone Laboratories Incorporated, Murray Hill, N.J.

[22] Filed: Aug. 25, 1972
[21] Appl. No.: 283,827

[52] U.S. Cl. ............... 333/73 R, 333/22 R, 333/76, 333/80 T, 333/81 R
[51] Int. Cl. ........ H03h 7/04, H03h 7/14, H01p 1/24
[58] Field of Search .................. 333/31 R, 31 A, 76, 333/22, 80 T, 80 R, 81 B, 81 A, 1, 1.1; 331/107, 107 G, 107 T

[56] References Cited

UNITED STATES PATENTS

| | | | |
|---|---|---|---|
| 3,422,378 | 1/1969 | La Rosa | 333/33 X |
| 3,289,113 | 11/1966 | Boutelant | 333/1.1 |
| 3,437,957 | 4/1969 | Ames | 333/1.1 X |

OTHER PUBLICATIONS

Rogers, "The Theory of Electrical Networks in Electrical Communications and Other Fields" MacDonald London; pages 335–348.

*Primary Examiner*—Rudolph V. Rolinec
*Assistant Examiner*—Marvin Nussbaum
*Attorney*—W. L. Keefauver

[57] ABSTRACT

This application describes a conductance-loaded transmission line "resonator." The "resonator" comprises a reactively terminated transmission line along which there are connected a plurality of shunt conductances. The termination and the conductances are spaced such that at band-center, each conductance is in the region of a voltage null. The use of such a conductance-loaded transmission line as the resonator of an oscillator, and as the frequency selective portion of a filter are described.

13 Claims, 12 Drawing Figures

CONDUCTANCE-LOADED TRANSMISSION LINE RESONATOR

This application relates to dissipative frequency-selective circuits.

BACKGROUND OF THE INVENTION

Frequency selective circuits are commonly used as filters to segregate selected bands of signals, and in conjunction with active elements to generate electromagnetic wave energy. Typically, such circuits are realized by means of low-loss reactive elements. For example, at the lower frequencies lumped inductors and capacitors are used. At the higher microwave frequencies, conductively bounded cavities, or lengths of transmission line are advantageously used. Difficulties arise, however, when one attempts to apply these well-known techniques in certain situations. Specifically, in integrated circuits there generally is no room for large volume cavities, while integrated thin film transmission lines are much too lossy to be used in an efficient filter network.

It is, accordingly, a first object of the present invention to realize efficient frequency-selective networks using lossy transmission lines.

There are also situations wherein low-loss reactive networks can be readily realized, but when used in conjunction with active elements result in unstable oscillators due to multimoding effects. For example, an IMPATT diode will tend to mode hop, resulting in an unstable, noisy signal source.

Accordingly, it is a second object of the present invention to stabilize oscillators.

SUMMARY OF THE INVENTION

A frequency-selective network, in accordance with the present invention, comprises a length of transmission line, reactively terminated at one end, and along which a plurality of shunt conductances are spaced at half-wave intervals. At band-center, the conductances are located in the regions of voltage nulls, and a high input admittance is observed at the input end of the line. Out-of-band, however, the nulls shift and large absorption occurs, lowering the input admittance of the line. The sharpness of the band characteristic is a function of the number of shunt conductances used and their magnitude.

In the usual low-loss, reactive resonant circuit, the out-of-band impedance becomes highly reactive and essentially all the energy coupled into the resonator is reflected back towards the signal source. By contrast, out-of-band, a conductance-loaded transmission line "resonator" becomes highly conductive, and absorbs the energy. When used in conjunction with an active element, multimoding effects are suppressed.

It should be noted that the inclusion of energy absorbing elements along a transmission line, in accordance with the present invention, is to be distinguidhsed from the seemingly similar use of mode suppressing lossy elements in certain classes of multimode devices. In the prior art use, the lossy elements serve solely to suppress undesired modes supportable by the system, while not interacting with the desired mode. By contrast, lossy elements, as used herein, are specifically intended to interact with the wave energy associated with the desired mode supported by the transmission line. Thus, shunt conductances are advantageously employed for the reasons described herein in single mode as well as multimode transmission lines.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
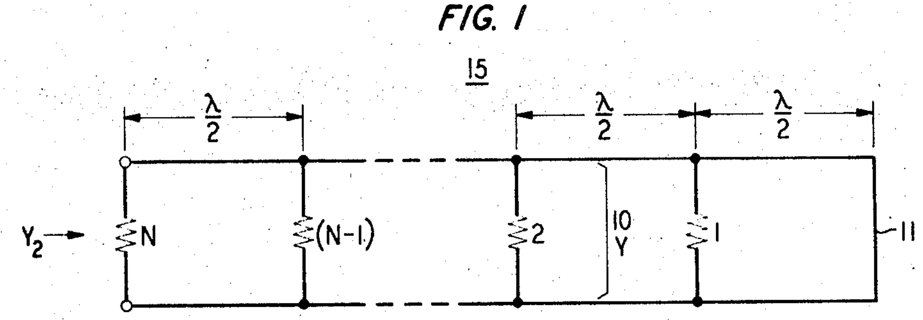
FIG. 1 shows a conductance-loaded transmission line "resonator" in accordance with the present invention.

Referring to the drawings, FIG. 1 shows a first embodiment of a conductance-loaded transmission line "resonator" 15, in accordance with the present invention. The resonator comprises a length of transmission line 10, having a characteristic admittance Y, terminated at one end by means of a short circuit 11, and along which there are distributed a plurality of shunt-connected conductances 1, 2, . . . (N-1) and N. The conductances are located at voltage null positions along the line when the latter is energized in a particular mode and at a particular freqency of interest. In the illustrative embodiment shown, nulls occur at distances from the short circuit corresponding to integral multiples of half a wavelength at the particular frequency of interest. Accordingly, conductance 1 and each of the other conductances, is spaced half a wavelength or an integral multiple of half a wavelength from short circuit 11. As will be explained in greater detail hereinbelow, the use of different terminations will modify the spacing between the termination and the first adjacent conductance. The spacing between conductances, however, remains half a wavelength at the particular frequency of interest.

While shown, symbolically, as a pair of parallel conductors, it is readily understood and recognized that transmission line 10 can, alternatively, comprise a length of coaxial cable, a balanced or unbalanced strip transmission line, or a hollow metallic waveguide.

Figure 2:
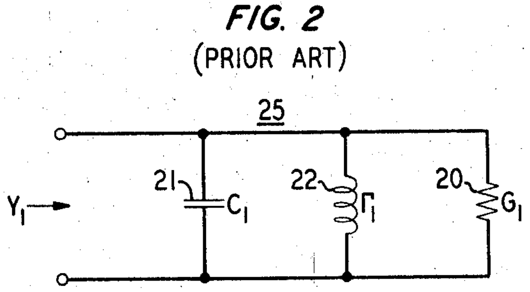
FIG. 2 (PRIOR ART)
FIG. 2 shows the equivalent circuit of a prior art reactive resonator.

The circuit equivalent of a typical reactive resonator can be represented by the GCΓ network 25 shown in FIG. 2, where $G_1$ is the conductance of resistor 20; $C_1$ is the capacitance of capacitor 21; and $\Gamma_1$ is the reciprocal inductance of inductor 22.

Figure 3:
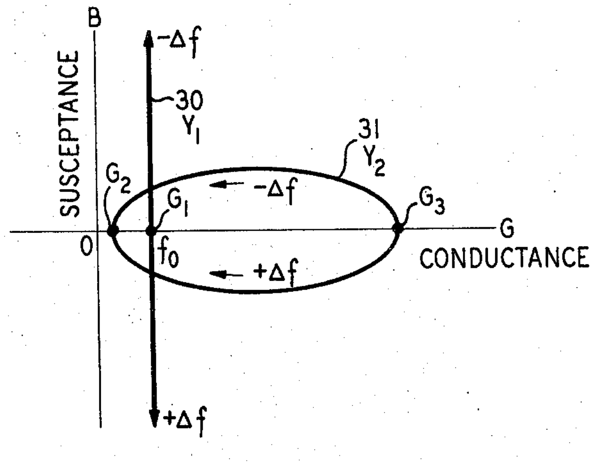
FIG. 3, included for purposes of explanation, shows the admittance characteristics of the resonators shown in FIGS. 1 and 2, in terms of their conductance and susceptance, as a function of frequency.

Curve 30 in FIG. 3 is a plot of the admittance $Y_1$ of network 25, in terms of its conductance G, and net susceptance B, as a function of frequency. In particular, curve 30 is a straight line, parallel to the susceptance axis, which intersects the conductance axis at $G_1$. The frequency at which this occurs is, of course, the resonant frequency of the network, and defines band-center. As the frequency deviates from band-center, $\pm\Delta f$, the magnitude of the susceptance term increases linearly, and the magnitude of the total admittance $Y_1$ approaches infinity.

By contrast, the admittance curve 31 for the conductance-loaded transmission line resonator 15 is an oval shaped function that intersects the conductance axis at two points, $G_2$ and $G_3$, where the transmission line loss per wavelength is assumed to be independent of frequency. (If line losses are frequency-dependent, curve 31 will tend to be a spiral). The higher conductance value, $G_3$, represents band-center, corresponding to that frequency at which the shunt conductances 1, 2 . . . N are located at voltage nulls along the transmission line and are effectively out of the network. As such, the input admittance $Y_2$ at band-center is purely conductive ($Y_2 = G_3$) and is defined solely by the line and the short circuit 11 at its far end. The magnitude of $G_3$ is, thus, a function of the attenuation per unit length of line. As the attenuation decreases, $G_3$ increases.

As the frequency deviates, $\pm\Delta f$, away from band-center, the voltage across the shunt conductances 1, 2 . . . N increases, reaching a maximum when the distances from the short circuit to the respective conductances correspond to odd multiples of a quarter of a signal wavelength. The magnitude of $G_2$ depends upon the magnitude and the number of shunt conductances used. For relatively small values of conductance (i.e., $G < 0.5Y$) and a large number of such elements (i.e., 10 or more), $G_2$ tends towards the characteristic admittance, Y, of the transmission line. More generally, $G_2$ can have a wide range of values.

As is apparent from an examination of curves 30 and 31, shown in FIG. 3, a reactive resonator is quite different from a conductance-loaded transmission line resonator. Some of the uses and advantages of the latter will now be illustrated and explained in connection with signal oscillators and signal filters.

OSCILLATORS

Figure 4:
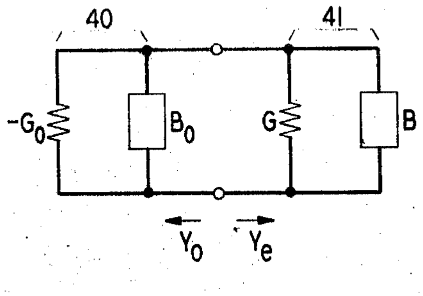
FIG. 4, included for purposes of explanation, shows the equivalent circuit of an oscillator.

The equivalent circuit of an oscillator can be represented, as in FIG. 4, by an equivalent circuit that includes a first circuit portion 40, representative of the active element, and a second circuit portion 41, representative of the external circuit connected thereto. Specifically, the active element of the oscillator can be represented by a net negative conductance $-G_o$, and a net shunt susceptance $B_o$, for a total net admittance $$Y_o = -G_o + j\omega B_o \quad (1)$$

The external circuit portion 41 can similarly be represented by an equivalent net positive conductance G, and a net shunt susceptance B, for a total net admittance $Y_e$ given by $$Y_e = G + j\omega B \quad (2)$$

Stable oscillations occur when $$Y_o + Y_e = 0 \quad (3)$$

or $$Y_e = -Y_o \quad (4)$$

Figure 5A:
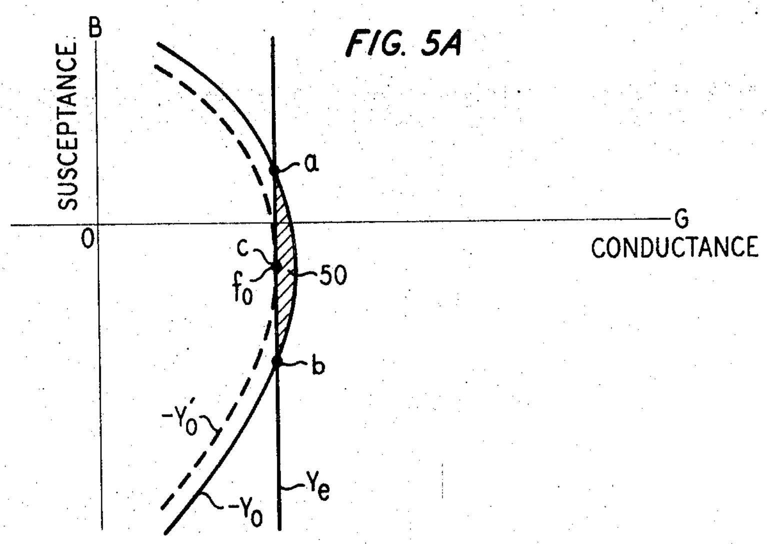
FIGS. 5A, 5B, and 5C show the admittance variations of a number of different oscillator circuits as a function of frequency.

If $Y_o$ is a "well behaved" function of frequency, a plot of the conductance-susceptance characteristic of $-Y_o$ and $Y_e$ as a function of frequency would appear as shown in FIG. 5A.

Since the two curves intersect at points *a* and *b*, conditions for oscillations exist. However, there is a region, represented by the shaded area 50, wherein there is an excess of negative conductance. As a result, the device saturates, effectively causing the $-Y_o$ characteristic to shift until the two curves are tangent, as illustrated by the dashed curve $-Y_o'$. Stable oscillations will then occur at a frequency $f_o$ corresponding to a point *c* at which the $Y_e$ and the $-Y_o'$ curves are tangent.

Figure 5B:
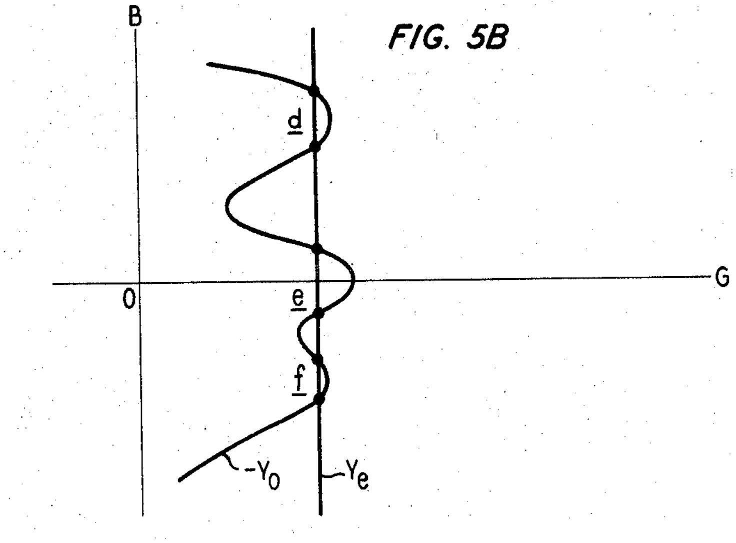

In a more typical case, however, such as with IMPATT diodes and tunnel diodes, for example, the admittance-susceptance characteristic is more complex, and may include loops and/or wave-like regions, such as are illustrated in FIG. 5B. Here it will be noted that the $-Y_o$ curve intersects the $Y_e$ curve in three regions *d*, *e* and *f*. As a result, the diode is capable of oscillating at any one of three different frequencies. Furthermore, there is no certainty that even when it is established at one of these frequencies, it will not switch, under random perturbations, to one of the other two frequencies. This switching, or mode hopping, results in a noisey oscillator at best, and an unstable one at worst.

Figure 5C:
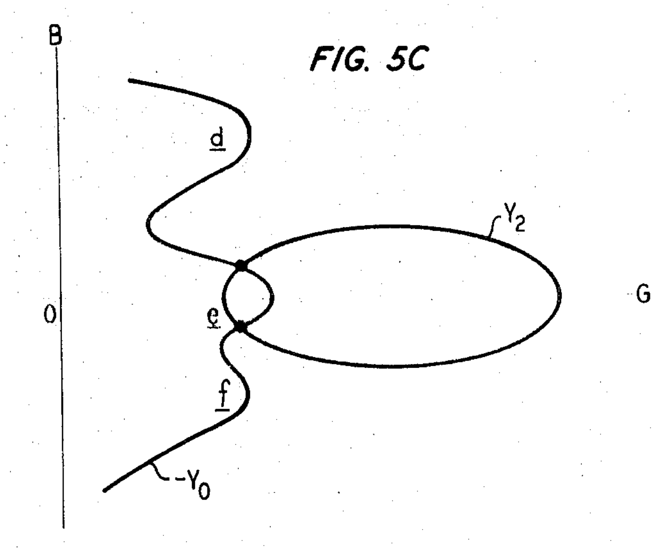

The unstable oscillatory conditions described hereinabove are avoided, in accordance with the present invention, by using a conductance-loaded transmission line resonator of the type illustrated in FIG. 1 in place of the more conventional L-C resonator. The reason for this can be readily seen in FIG. 5C, which shows the same $-Y_o$ characteristic as was illustrated in FIG. 5B, and the conductance-susceptance characteristic $Y_2$ of a conductance-loaded transmission line. As can be seen, whereas the prior art resonator circuit intersected the $-Y_o$ along three regions *d*, *e* and *f*, the $Y_2$ characteristic, because of its oval shape, intersects the $-Y_o$ characteristic at only one region *e*. Thus, there is only one frequency at which the active elemnet, represented by curve $-Y_o$can oscillate. Mode hopping is no longer possible, at least for the type of instability described herein, and as a result, a less noisy and more stable oscillator results.

Figure 6:
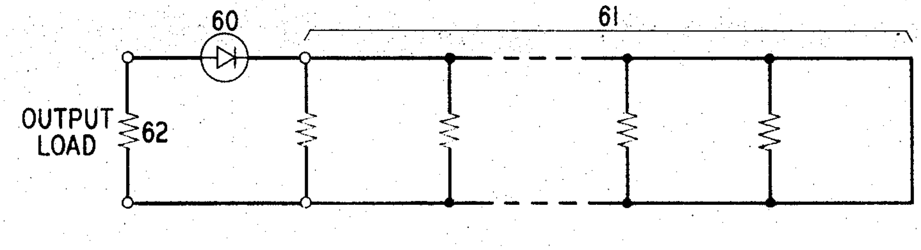
FIGS. 6 and 7 show two oscillator circuits in accordance with the present invention.

FIG. 6 shows a first embodiment of an oscillator utilizing a conductance-loaded transmission line resonator. The oscillator comprises an active element 60, such as, for example, an IMPATT diode, a Gunn effect diode, or a tunnel diode, connected in series with a conductance-loaded transmission line resonator 61 and an output load 62.

Figure 7:
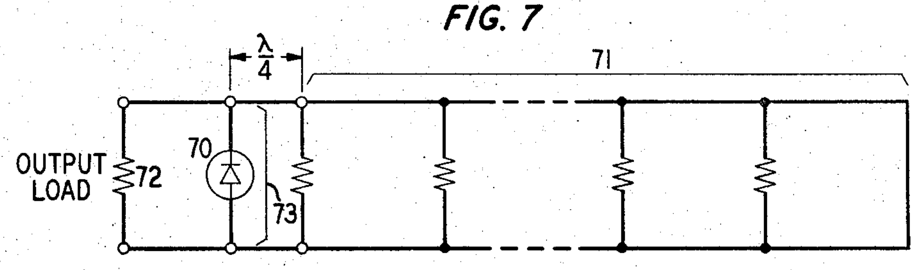

FIG. 7 shows a second embodiment of an oscillator, in accordance with the present invention, wherein the active element 70 is connected in parallel with conductance-loaded transmission line resonator 71 and a load 72. However, in this embodiment, a quarter-wave section of line 73 is connected between the active element 70 and resonator 71 in order to transform the resonator's high conductance at bandcenter, to a low shunt conductance. The usual direct current circuits for biasing the active element in the negative conductance region of its current-voltage characteristic have not been shown in either embodiment.

FILTERS

In addition to its use as the resonator portion of an oscillator, a conductance-loaded transmission line can also be used as the frequency-selective element of a filter.

Figure 8:
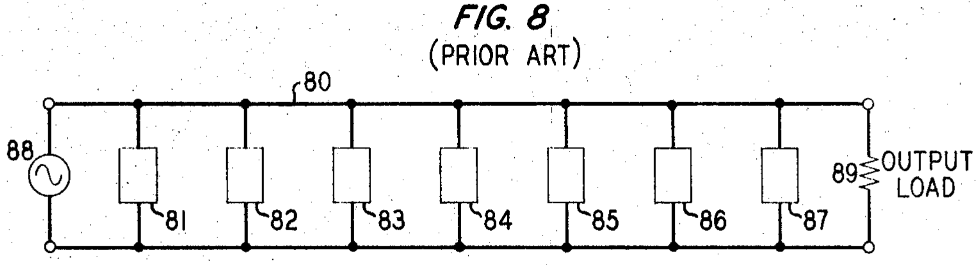
FIG. 8 (PRIOR ART)
FIG. 8 shows a prior art transmission line filter.

A typical prior art transmission line filter comprises a length of line along which there are distributed a plurality of susceptances. For purposes of explanation, a six section filter is illustrated in FIG. 8 comprising a length of transmission line 80 along which there are distributed seven shunt susceptances 81, 82, . . . 87, to form the above-mentioned six section filter. A signal source 88 is connected at one end of the line, and an output load 89 is connected at the opposite end of the line. Two cases were analyzed. In the first case, line 80 was considered to be lossless; in the second case, a line loss of 0.1 db/wavelength was postulated. The resulting transmission losses as a function of frequency, computed for both cases, are tabulated in Table I.

TABLE I

| Frequency — $f$ (Normalized with respect to band-center) | Transmission Loss — db | |
|---|---|---|
| | Case 1 | Case 2 |
| 1.000 | 0.000 | 15.892 |
| 0.9950 | 0.000 | 15.993 |
| 0.9900 | 0.000 | 16.305 |
| 0.9850 | 0.000 | 16.861 |
| 0.9800 | 0.009 | 17.719 |
| 0.9750 | 0.134 | 18.957 |
| 0.9700 | 1.110 | 20.653 |
| 0.9650 | 4.627 | 22.840 |
| 0.9600 | 10.251 | 25.470 |

It will be noted that for Case 1, there is no transmission loss between source 88 and load 89 at band-center ($f = 1.0000$), and over the passband between band-center and about 0.9800. Below 0.9800, the transmission decreases to 10.251 db at $f = 0.9600$. (While not included in the tabulation, the passband is symmetrical about band-center so that the transmission losses are the same at frequencies proportionately above $f = 1.0000$).

The transmission loss of Case 2, however, is markedly different. The effect of loss along line 80 results in a 15.892 db transmission loss at band-center, which increases to 25.470 at $f = 0.9600$. While the total change in the transmission loss across the band is about 10 db in both cases, the loss at band-center in Case 2 would, typically, be unacceptable in a filter.

The above notwithstanding, a lossy transmission line can be used as a filter, in accordance with the present invention, by loading the line with conductances instead of susceptances, and utilizing the reflected signal rather than the transmitted signal. Such a filter, illustrated in FIG. 9, comprises a length of transmission line 90, along which there are connected a plurality of shunt conductances. For purposes of illustration, ten conductances 91, 92, . . . 100 are shown. The end of the line is terminated by means of a short circuit 101. Adjacent conductances are spaced apart a distance corresponding to half a wavelength at band-center. Similarly, the last conductance 100 is spaced half a wavelength from the line terminaing short circuit 101.

A signal source 102 is connected to port 1 of a three port circulator 103. Line 90 is connected to port 2 of the circulator, and an output load 104 is connected to circulator port 3.

In operation, a signal from source 102 is coupled by means of circulator 103 to line 90. Any signal component reflected from the line is, in turn, coupled by the circulator to the output load 104.

For purposes of comparison, Table II, below, gives the reflected signal from such a ten section, conductively-loaded transmission line filter for the same transmission line loss of 0.1 db per wavelength. The shunt conductances used for this calculation are all equal to 0.12 Y, where Y is the characteristic admittance of line 90.

TABLE II

Case 3

| Frequency — $f$ (Normalized) | Reflection Loss — db |
|---|---|
| 1.0000 | 0.96 |
| 0.9950 | 1.2 |
| 0.9900 | 2.0 |
| 0.9850 | 3.2 |
| 0.9800 | 4.6 |
| 0.9750 | 6.1 |
| 0.9700 | 7.7 |
| 0.9650 | 9.4 |
| 0.9600 | 11.0 |

It will be noted that at band-center, the reflection loss is less than a db, as compared with a greater than 15 db transmission loss for Case 2. At $f = 0.9800$, the reflection loss is 4.6 db as compared with a transmission loss of over 17 db. While the illustrative filter is not as flat over the useful passband as the susceptance-loaded transmission line filter, it should be noted that no attempt was made to optimize the design for any particular passband.

Figure 9:
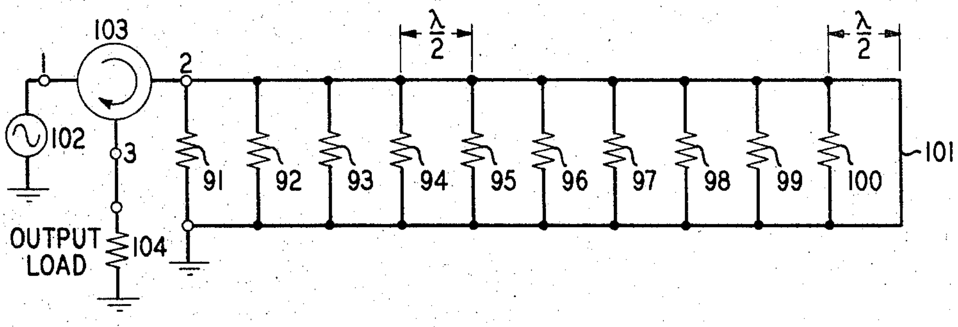
FIG. 9 shows a transmission line filter in accordance with the present invention.

While the filter configuration of FIG. 9 is of particular interest when the available transmission line is lossy, it is in no way limited to such lines. For example, the same filter structure with a lossless transmisslon line would produce the response tabulated in Table III.

TABLE III

Case 4

| Frequency — $f$ (Normalized) | Reflection Loss — db |
|---|---|
| 1.0000 | 0.000 |
| 0.9950 | 0.34 |
| 0.9900 | 1.2 |
| 0.9850 | 2.5 |
| 0.9800 | 4.0 |
| 0.9750 | 5.7 |
| 0.9700 | 7.4 |
| 0.9650 | 9.2 |
| 0.9600 | 11.0 |

It will be noted that the reflection loss for Case 4 is only slightly less than for Case 3. That is, in a conductively-loaded transmission line filter, the transmission line loss has relatively little effect upon the overall filter characteristic. By contrast, because of the high resonance currents generated in a susceptance-loaded transmission line filter, line losses become critical. Indeed, for a conventional transmission line resonator, the dissipation per wavelength limits the ultimate frequency selectivity that can be realized since this selectivity, as measured by the unloaded cavity Q, is related to the number of internal reflections possible in any internal section before a 3 db energy loss occurs. By contrast, the frequency selectivity of a conductance-loaded transmission line resonator stems for other physical considerations and, therefore, is not similarly limited. Thus, contrary to expectations, the addition of conductance in the manner disclosed herein, can, in fact, provide greater selectivity than can the addition of reactive element to a system possessing significant conductor losses.

In the various illustrative embodiments described hereinabove, the transmission line was described as being terminated by means of a short circuit located at a distance corresponding to half a wavelength at band-center from the next adjacent conductive shunt. However, the equivalence of a short-circuited half-wavelength section of transmission line, and an open-circuited, quarter-wavelength section of line is well known. Thus, in each of the above-described circuits the last half-wavelength of transmission line, and the terminating short circuit can be replaced by an open-circuited, quarter-wavelength section of line. More generally, the transmission line can be terminated by means of any reactive termination and a length of line $\theta$ given by $$\theta = (m + \tfrac{1}{2})\pi - \arctan B, \qquad (5)$$

where $m$ is any integer;

and

B is the susceptance of the termination and includes zero (a short circuit) and infinity (an open circuit).

In all cases at band-center the termination is such as to produce voltage nulls in the regions of the shunt conductances.

Figure 10:
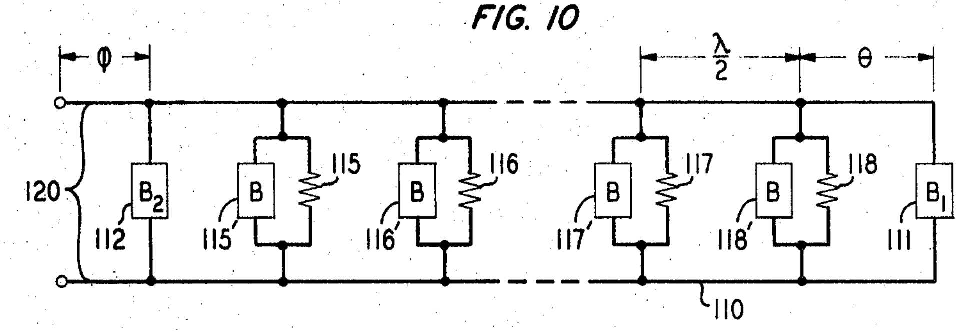
FIG. 10 shows a more generalized embodiment of a conductance-loaded transmission line resonator.

In addition to the variety of terminations that can be employed, there are many other modifications of the basic conductance-loaded transmission line circuit that can be employed to achieve particular results. For example, the shunt conductances can all be equal, as in the examples given hereinabove or, alternatively, some or all of them can have different values. Furthermore, the simple oval shaped admittance characteristic, illustrated in FIG. 3, can be modified by the inclusion of a plurality of shunt susceptances connected in parallel with the conductances, and/or the use of a matching susceptance and impedance transformer at the input end of the line. In particular, the production of an impedance match, or zero reflection, at the terminals of the conductance-loaded line at a frequency away from band-center, produces a filter transmission zero at that frequency. Since the admittance at band-center differs significantly from a matched impedance, the production of a transmission zero at the frequency of choice, perturbs only slightly the transmission at band-center. Thus, by such matching means, any degree of filter skirt selectively can be realized. These various features and modifications are illustrated in FIG. 10 which shows a generalized conductance-loaded transmission line structure including a length of transmission line 110 terminated by means of a susceptance 111 spaced a distance $\theta$, as given by equation (5), from the adjacent shunt element along the line. In this embodiment, a plurality of complex shunt admittances are distributed along line 110 comprising conductances 115, 116, 117 . . . 118 and the parallel-connected susceptances 115', 116', 117' . . . 118'. The several conductances can either be equal to each other or some or all can be unequal. Similarly, the susceptances can all be equal to each other or some or all can be unequal. At the input end of line 110, a matching susceptance 112, and an impednace matching section of transmission line 120 of length $\phi$ are included for matching the transmission line to any arbitrary extenral load. While all of these features would not necessarily be included in any one embodiment of the invention, it is apparent that the various above-described arrangements are illustrative of but some of the many possible specific embodiments which can represent applications of the principles of the invention. Numerous and varied other arrangements can readily be devised in accordnace with these principles by those skilled in the art without departing from the spirit and scope of the invention.

I claim:

1. A frequency-selective circuit comprising:

a length of transmission line reactively terminated at one end;

said line being supportive of electromagnetic wave energy in a desired mode over a given frequency band of interest;

characterized in that:

a plurality of shunt conductances are connected along said line to interact with said wave energy;

and in that said termination and said conductances are spaced apart to produce a voltage null across each conductance at a frequency within said band of interest.

2. The circuit according to claim 1 wherein said termination is a short circuit;

and wherein the distance between said termination and each of said conductances corresponds to an integral number of half wavelengths at said frequency of interest.

3. The circuit according to claim 1 wherein said termination is an open circuit;

and wherein the distance between said termination and each of said conductances corresponds to an odd integral number of quarter wavelengths at said frequency of interest.

4. The circuit according to claim 1 wherein said conductances are spaced apart a distance corresponding to half a wavelength at said given frequency of interest;

and wherein said line is terminated by a susceptance B at said given frequency spaced a distance $\theta$ from the last of said conductances where $$\theta = (m + \tfrac{1}{2})\pi - \arctan B$$

and $m$ is any integer.

5. A circuit according to claim 1 including, in addition:

a signal source;

an output load;

means for coupling said signal source to the other end of said line;

and means for coupling the component of signal reflected by said line to said output load.

6. The circuit according to claim 5 wherein said means for coupling said signal source, and said means for coupling said reflected signal is a multiport circulator.

7. The circuit according to claim 1 including, in addition:

an active element;

an output load;

means for coupling said element to said load;

and means for coupling said element to the other end of said transmission line.

8. The circuit according to claim 7 wherein said active element is a diode having a current-voltage characteristic including a negative admittance region;

and wherein said diode is connected in series with said output load and with said transmission line.

9. The circuit according to claim 7 wherein said active element is a diode having a current-voltage characteristic including a negative admittance region;

wherein said diode is connected in shunt across said output load;

and wherein said means for coupling said active element to said transmission line comprises a section of transmission line whose length corresponds to a quarter of a wavelength at said frequency of interest.

10. The circuit according to claim 1 wherein all of said conductances are equal.

11. The circuit according to claim 1 wherein some or all of said conductances are unequal.

12. The circuit according to claim 1 including a plurality of susceptances connected in parallel with said conductances.

13. The circuit according to claim 1 including impedance matching means connected at the other end of said transmission line.

* * * * *